United States Patent [19]

Jack et al.

[11] Patent Number: 4,506,021

[45] Date of Patent: Mar. 19, 1985

[54] O'-PHASE SIALON CERAMIC PRODUCT AND A METHOD OF FORMING DENSE CERAMIC PRODUCT

[75] Inventors: Kenneth H. Jack, North Shields, England; Mark B. Trigg, St. Ives, Australia

[73] Assignee: Lucas Cookson Syalon Limited, Birmingham, England

[21] Appl. No.: 579,172

[22] Filed: Feb. 10, 1984

[30] Foreign Application Priority Data

Feb. 26, 1983 [GB] United Kingdom ................ 8305412

[51] Int. Cl.$^3$ .............................................. C04B 35/58
[52] U.S. Cl. ........................................ 501/98; 264/65; 423/327; 423/344; 501/152
[58] Field of Search .......................... 501/98, 97, 152; 423/327, 344; 264/65

[56] References Cited

U.S. PATENT DOCUMENTS 4,127,416 11/1978 Lumby et al. ...................... 501/98
4,143,107  3/1979 Ishii et al. ........................... 501/98
4,331,771  5/1982 Washburn .......................... 264/65

FOREIGN PATENT DOCUMENTS 50-128708 10/1975 Japan .................................. 264/65

OTHER PUBLICATIONS

Jack, K. H. "Review: Sialons and Related Nitrogen Ceramics" J. Maier, Sci. 11(1976), pp. 1135–1158, Fig. 11.

*Primary Examiner*—Helen M. McCarthy
*Attorney, Agent, or Firm*—Holman & Stern

[57] ABSTRACT

A silicon aluminium oxynitride product having the crystal lattice structure of silicon oxynitride but of expanded cell dimensions is produced by sintering a powder mixture of 50 to 60 wt % of $Si_3N_4$, 22 to 35 wt % $SiO_2$, 1 to 20 wt % $Al_2O_3$ and 1 to 15 wt % of at least one oxide of Y, Li, Mg, Ca, Sc, Ce or another rare earth element, the molar ratio of $SiO_2$ to $Si_3N_4$ being greater than 1:1 and the percentages being based on the total weight of the ingredients. Sintering is effected at 1600° to 1900° C. in a non-oxidizing atmosphere so that the $Al_2O_3$, said at least one oxide and part of the $SiO_2$ in the mixture react to form a liquid phase from which silicon aluminium oxynitride having an expanded silicon oxynitride crystal lattice is crystallized. The sintered material is cooled to form a product containing said silicon aluminium oxynitride and at least one grain boundary phase containing silicon and the metal(s) of said at least one oxide.

24 Claims, No Drawings

O'-PHASE SIALON CERAMIC PRODUCT AND A METHOD OF FORMING DENSE CERAMIC PRODUCT

The nitrogen ceramics are receiving much attention, especially silicon aluminium oxynitrides or SIALONS having the crystal lattice structure of beta-phase silicon nitride $Si_6N_8$ which has been expanded by the partial substitution of some of the silicon atoms by aluminium, together with the partial substitution of some of the nitrogen atoms by oxygen while maintaining valency balance. These materials exhibit good strength, creep and hardness while exhibiting excellent resistance to chemical attack and oxidation. They also are capable of maintaining their superior properties at elevated temperature (of the order of 1200° to 1400° C.). Because these materials exhibit such excellent properties, much research has been conducted into fabrication techniques which avoid mechanical working of the materials involved in their production and in working of the products themselves. Processing which does not involve the use of pressing during sintering is attractive since it allows complex shapes to be obtained with little working of the products themselves. Sialons of the β-silicon nitride crystal lattice structure have reached this stage in their production, and densities previously only associated with the hot pressing route are now the norm.

Silicon oxynitride ($Si_2N_2O$) has been known for a number of years as a useful engineering ceramic, and possible routes to its production are:

$$3Si + SiO_2 + 2N_2 \rightarrow 2Si_2N_2O \qquad (1)$$

$$SiO_2 + Si_3N_4 \rightarrow 2Si_2N_2O \qquad (2)$$

$$2SiO_2 + 3C + N_2 \rightarrow Si_2N_2O + 3CO \qquad (3)$$

However, routes (1) to (3) cannot be used to produce dense, pure $Si_2N_2O$ ceramics. Also, reactions (2) and (3) are very slow.

While various densifying additives have been used with silicon oxynitride, hot pressing is normally required to obtain low porosity products.

Pressureless sintering of silicon oxynitride using alumina as a densifying additive has received limited success, as also has reaction bonding. In the presence of reaction aids, however, while densities up to the order of 95% of theoretical have been reported in the literature, little evidence has been shown of such densities being sustained in production artefacts.

It has been shown, K. H. Jack, Trans and J. Brit Ceram Soc. 72, 376–84 (1973) that limited replacement

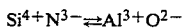
$$Si^{4+} + N^{3-} \rightleftharpoons Al^{3+} + O^{2-}$$

could occur in $Si_2N_2O$ as well as in β-phase $Si_6N_8$ without change of crystal structure. In addition, other cations such as lithium $Li^{1+}$ and/or calcium $Ca^{2+}$ could fill vacant sites while maintaining valency balance. However, little attention has been given to the usefulness of such products as engineering ceramics, or to manufacturing methods for producing such products which allow the avoidance of hot pressing.

Throughout this specification, the term "silicon aluminium oxynitride" is to be construed as meaning not only ceramic materials comprising silicon, aluminium, oxygen and nitrogen but also such materials which additionally include other cations.

This invention relates to dense ceramic products containing silicon aluminium oxynitride having the crystal lattice structure of silicon oxynitride but of expanded cell dimensions (hereinafter referred to as O'-phase silicon aluminium oxynitride) and to methods of making such a product especially routes involving pressureless sintering.

In one aspect of the present invention there is provided a silicon aluminium oxynitride product containing from 80% to 98% by weight of O'-phase silicon aluminium oxynitride as a first phase and 20% to 2% by weight of at least one second phase which contains silicon and at least one metal other than silicon or aluminium, said percentages being based on the total weight of said first and second phases, said product being from about 85% to about 99% of theoretical density and having a microstructure which is a crystallised network of said O'-phase silicon aluminium oxynitride with said at least one second phase as a grain boundary phase.

Preferably, said first and second phases constitute a major proportion of said product. Most preferably, the product consists essentially of said first and second phases together with the optional inclusion of an inert dispersed phase.

Said at least one second phase may consist of or include a glass phase which usually contains aluminium.

Said at least one second phase may consist of or include a crystalline phase.

Preferably, said metal other than silicon and aluminim is selected such that it reacts with silica and alumina to form a glass phase which is molten during the sintering of said product and from which said O'-phase silicon aluminium oxynitride precipitates. For example said metal other than silicon and aluminium is selected from the group consisting of yttrium, lithium, magnesium, calcium, scandium, cerium and the other rare earth elements.

According to a second aspect of the present invention, there is provided a method of forming a dense ceramic product comprising the steps of forming a powder mixture containing (a) 50% to 65% by weight silicon nitride, (b) 22% to 35% by weight silica, in which the molar ratio of silica to silicon nitride is at least 1:1, (c) 1% to 20% by weight (on an oxide basis) of an oxygen-containing aluminium compound and (d) 1% to 15% by weight (on an oxide basis) of at least one compound selected from oxides, hydroxides, carbonates, oxynitrides, nitrates or silicates of metals other than silicon or aluminium, said percentages being based on the total weight of ingredients (a) to (d); sintering said powder mixture at a temperature of from 1600° C. to 1900° C. in a non-oxidising atmosphere whereby said aluminium compound, said at least one compound and part of said silica in said mixture react to form a liquid phase from which is precipitated O'-phase silicon aluminium oxynitride; and cooling the sintered material to form a product containing said O'-phase silicon aluminium oxynitride and at least one grain boundary phase containing silicon and said metal.

The term "oxygen-containing aluminium compound" includes aluminium oxide or an oxygen-containing aluminium compound which is capable of forming aluminium oxide at said sintering temperature.

Preferably said mixture contains silicon nitride in an amount of from 50% to 60% by weight, said silica in an amount of from 25% to 30% by weight, said aluminium compound in an amount of from 1.0% to 15% by weight (on an oxide basis) and said at least one compound in an amount of from 3% to 12% by weight (on an oxide basis).

Preferably, the sintering step is performed in the absence of applied pressure.

Conveniently said at least one compound is selected so as to react with part of the silica and the oxide of aluminium to give, during reaction, an alumino silicate of said metal which is molten at the sintering temperature.

Said molten alumino silicate of said metal may also contain combined nitrogen for example by dissolution of silicon nitride at the sintering temperature.

The mixture may be sintered at 1600° C. to 1900° C. and cooled naturally to room temperature to ensure that a second phase comprising a glass containing silicon, aluminium and said metal exists in said product.

Conveniently the product after natural cooling is heat treated by reheating the product to a temperature of the order of 1000° C. to 1400° C. to cause the glass phase to be devitrified.

Alternatively, the devitrification is achieved by cooling the product after sintering at 1600° C. to 1900° C. at a sufficiently slow rate to cause the glass to be devitrified.

Typically said cooling rate is less than 100° C./hr.

Preferably, said metal of said compound is yttrium, lithium, magnesium, calcium, scandium, cerium or another rare earth element, and said compound is the oxide or a compound which decomposes to the oxide at the sintering temperature.

Alternatively, said metal compound may be reacted with part of the silica or with silica and alumina to produce a vitreous or crystalline compound prior to reaction with the remaining components to obtain the required products.

Where said metal compound is yttria, the silica and yttria are preferably reacted in the molar ratio 2:1 to form yttrium silicate ($Y_2Si_2O_7$) and added to the reacting species and the mixture sintered to obtain the dense ceramic product.

In a first set of examples according to the invention, a mixture was made up comprising 59.6 g of silicon nitride as supplied by H. Starck of West Germany and known as grade LC10, being of high purity containing of the order of 3% by weight of surface silica, 0.02% by weight iron, 0.05% by weight aluminium and 0.07% by weight calcium all as oxides, and of mean particle size 0.5 micrometers; 27.5 g of crushed silica of greater than 99.9% purity containing of the order of 100 ppm aluminium and 20 ppm of other metals all present as oxides and supplied by Thermal Syndicate Limited of England with mean particle size 2 micrometers; 4.5 g of alumina as supplied by The Aluminium Company of America and termed Alcoa A16 of greater than 99.9% purity containing as impurities of the order of 0.08% soda, 0.05% silica, 0.03% lime, 0.05% magnesia and 0.01% iron oxides by weight and with particle size less than 1 micrometer; 8.4 g of yttria of 99.9% purity containing not more than 100 ppm of common metal oxides and of particle size not exceeding 10 micrometers supplied by Rare Earth Products Limited, England.

The mixture was then milled using alumina media in isopropyl alcohol for 25 hours, and the resulting homogeneous mixture was dried at 125° C. and it was estimated that the alumina pick-up from the milling operation had increased the alumina content of the starting powder by 2.0 g. Thus, allowing for the surface silica on the silicon nitride and the pick-up of the alumina during milling, the percentage composition by weight of the powder mixture, identified as (B) in Table 1, was: 56.7% silicon nitride, $Si_3N_4$; 28.7% silica, $SiO_2$; 6.4% alumina, $Al_2O_3$; and 8.2% yttria, $Y_2O_3$, the percentages being based on the total weight of these ingredients. It will be appreciated that the 56.7% by weight of silicon nitride together with 24.3% by weight of the silica provides a 1:1 molar ratio while the remaining 4.4% by weight of the silica is capable of reacting with the alumina and yttria at the sintering temperature to produce a molten yttrium alumino silicate in which nitrogen may also be present by dissolution from the silicon nitride. It is this molten phase which provides the liquid medium from which the O'-phase silicon aluminium oxynitride is precipitated.

From the mixture (B), a number of preforms were prepared to investigate the effect of sintering temperature on the final product. Preforming consisted of introducing the powders into the cavity of a steel die and pressing between steel punches uniaxially at room temperature at 90 MPa followed by isostatic pressing at 200 MPa. The samples so produced were buried in a silica/silicon nitride powder mixture in the molar ratio 1:1 and successively heated without the application of pressure over the temperature range 1600° C. to 1850° C. in high purity nitrogen using a carbon resistance furnace, where each sample was held for a time ranging from 30 mins. to 5 hours at the required temperature. Weight loss for all samples was less than 1.0% by weight.

Examination of the resultant products using X-ray diffraction showed the crystalline phases to comprise mainly silicon aluminium oxynitride of expanded silicon oxynitride lattice structure (O'-phase) occupying at least 80% by weight. Samples produced at the lower temperatures of 1600° C. to 1700° C. evidenced minor quantities of the order of 5% by weight of alpha-phase silicon nitride, identified by X-ray diffraction, the quantity of said silicon nitride reducing as the temperature increased. Samples produced at the higher temperatures evidenced minor quantities of $\beta$-phase silicon nitride and $\beta'$-phase sialon together of the order of 5% by weight. However, the $\beta$-phase was found to be predominantly on the surface of the samples indicating that this second phase was probably due to the loss of silicon monoxide from the samples. It will be appreciated that this can be controlled by changing the protective environment from silica/silicon nitride (which provides a controlled silicon monoxide partial pressure around the samples to ensure correct reaction and inhibit weight loss) to e.g. boron nitride/silica mixtures and/or control of the furnace atmosphere:

While it was found that the protection medium could be used to reduce dissociation problems which occurred when sintering within the temperature range of 1850° C. to 1900° C., it was found preferable to sinter up to a maximum temperature of 1850° C.

In addition to the crystalline phases present, it was estimated that prior to any devitrification an amount of glass phase not exceeding 15% existed at the grain boundaries, said glass containing the elements yttrium, aluminium and silicon. Consequently, while alumina in the starting mixture had reacted with other constituents of the mixture to provide the liquid phase from which the expanded oxynitride had precipitated, only part of it had been responsible for expanding the silicon oxynitride.

A high bulk density of the order of 2.88 g cm$^{-3}$ measured by mercury immersion, i.e. 99% of the theoretical density of 2.90 g cm$^{-3}$ for composition (B) was achieved by firing for 1 hour at 1700° C. The weight loss was less than 1.0%. The Modulus of Rupture at room temperature using three-point bend with a span of 19 mm and a cross head speed of 0.1 mm per minute gave a value for this material in excess of 400 MPa with excellent oxidation resistance up to 1300° C. Similar results were obtained on firing the same composition (B) by a similar method for a longer time at a lower temperature, that is 5 hours at 1600° C.; the measured bulk density was 2.75 g cm$^{-3}$ i.e. 94.5% of the theoretical value.

A second set of examples according to the invention was then prepared in which the effect of variation of alumina content of the starting mixture was investigated while maintaining the proportions of the other reactants substantially the same as those in the first set of examples and sintering in the absence of pressure at a temperature in the range of 1600°–1850° C. with hold times in the range 30 minutes to 5 hours. The compositions of typical mixed and milled powders are given as (A), (C), (D), (E) and (F) in Table 1 for comparison with the composition (B) of the first examples. All samples gave room temperature Modulus of Rupture values greater than 400 MPa. and excellent oxidation resistance up to 1300° C.

As the alumina content decreased below the order of 8% by weight down to the order of 1% by weight densification became progressively more difficult but high bulk densities were achieved by firing at temperatures 1700°–1850° C. in the upper part of the whole range 1600° C.–1850° C., or by increasing the hold time, or both. Material (A) containing 4.7% by weight of alumina when fired for 60 minutes at 1700° C. gave a bulk density of the order of 2.83 g cm$^{-3}$ i.e. 98% of the theoretical density of 2.90 g cm$^{-3}$. As the alumina content increased above 13% to 20% the sintering became much easier. However, it was found that the oxidation resistance could not be maintained as the temperature rose above the order of 1300° C. Bulk densities were in excess of 2.83 g cm$^{-3}$ i.e. 98% of theoretical density.

Typical firing conditions for high density products with bulk densities not less than 95% of the theoretical density for the materials (A), (B), (C), (D), (E) and (F) containing increasing amounts of alumina from 2.2 to 14.7% by weight are given at the foot of Table 1.

While therefore it can be concluded that useful products were obtained over the alumina range of 1% to 20% by weight, it is preferable to use quantities within the range 1 to 15% by weight if both ease of sintering and good oxidation properties are desirable.

FROM TABLE 1

As the $Si_3N_4$ content of the starting mixture was reduced below 50% by weight, the $SiO_2$ required to provide a 1:1 molar ratio began to approach 20% by weight (21.4% by weight actual). This meant that the remaining constituents of the reaction constituted 28.6% by weight. It was found desirable that the $Al_2O_3$ content should not exceed 20% by weight of the total mixture and preferably not exceed 15% by weight while retaining the excess $SiO_2$ and the $Y_2O_3$ in substantially 2:1 molar proportions respectively. It was found that materials produced containing high amounts of $Al_2O_3$ (>20% by weight) were susceptible to bloating and although materials in which $Al_2O_3$ contents in the order of 15 to 20% by weight were also subject to bloating problems, such problems were not so pronounced and could be alleviated by careful control of the sintering cycle. For example, holding the sintered sample at an intermediate temperature (1500°–1600° C.) for half to one hour followed by raising to a final temperature of 1700° C. to 1800° C. and holding for half to one hour was found to overcome the problem. Temperature rise rates were of the order of 60° C. min$^{-1}$, but it will be appreciated that other sintering schedules could also be suitable in overcoming the bloating problem, e.g. a slower rise rate without the intermediate dwell should also provide suitable. The success of such modified thermal scheduling is attributed to the onset of high densification early in the sintering cycle followed by precipitation of the O'-phase in the liquid at the higher temperatures. Controlled sintering (e.g 2-step) led to improved density values for all samples. The maximum fired bulk density obtained for material E with a single stage firing of 1700° C. for 1 hour was 2.80 g cc$^{-1}$ compared with 2.84 g cc$^{-1}$ for a two stage firing of 1 hour at 1600° C., 1 hour at 1800° C. It will be noted that samples C and D were subjected to a two stage sintering in Table 1 while the remainder were single stage sintered.

As the $Si_3N_4$ content of the starting mixture was reduced below about 45% by weight of the starting mixture, it was found that the bloating problem became more difficult to overcome, even with the modified sintering programme and so it was concluded that a minimum of 50% by weight of $Si_3N_4$ in the starting mixture was capable of satisfactorily producing the product of the invention.

Further samples were then prepared as in the first set of examples, but now the $Y_2O_3$ content of the mixes was reduced to the order of 5 to 6% by weight and the excess silica arranged to provide a substantially 2:1 molar ratio of $SiO_2:Y_2O_3$ respectively. Starting materials and forming conditions were as in the previous examples. Typical compositions are shown for examples G through K in Table 2 with the firing condition being given at the foot of Table 2.

| | COMPOSITION % BY WEIGHT | | | | | |
|---|---|---|---|---|---|---|
| Sample | $Si_3N_4$ 1:1 molar | $SiO_2$ 1:1 molar | Excess $SiO_2$ | $Al_2O_3$ | $Y_2O_3$ | % Th. Density |
| E | 59.3 | 25.4 | 4.6 | 2.2 | 8.5 | 96 |
| A | 57.8 | 24.8 | 4.4 | 4.7 | 8.3 | 98 |
| B | 56.7 | 24.3 | 4.4 | 6.4 | 8.2 | 99 |
| C* | 54.9 | 23.5 | 4.2 | 9.6 | 7.8 | >99 |
| D* | 51.7 | 22.1 | 4.0 | 14.7 | 7.5 | >99 |
| F/ | 50.2 | 21.5 | 5.0 | 13.9 | 9.4 | >99 |

*fired at 1500° C. for 30 min. followed by 1700° C. for 1 hour.
/fired at 1600° C. for 1 hour. remainder fired at 1700° C. for 1 hour.

TABLE 2

| | COMPOSITION % BY WEIGHT | | | | | |
|---|---|---|---|---|---|---|
| Sample | $Si_3N_4$ 1:1 molar | $SiO_2$ 1:1 molar | Excess $SiO_2$ | $Al_2O_3$ | $Y_2O_3$ | % Th. Density |
| G* | 61.9 | 26.5 | 3.2 | 2.6 | 5.8 | 88 |
| H* | 60.5 | 25.9 | 3.1 | 4.8 | 5.7 | 91 |
| I* | 59.0 | 25.3 | 3.0 | 7.2 | 5.5 | 96 |
| J/ | 57.4 | 24.6 | 2.9 | 9.7 | 5.4 | 99 |

TABLE 2-continued

| Sample | Si$_3$N$_4$ 1:1 molar | SiO$_2$ | Excess SiO$_2$ | Al$_2$O$_3$ | Y$_2$O$_3$ | % Th. Density |
|---|---|---|---|---|---|---|
| K/ | 53.7 | 23.0 | 2.8 | 15.4 | 5.0 | 99 |

*fired at 1600° C. for 30 min. followed by 1800° C. for 1 hour.
/fired at 1600° C. for 30 min. followed by 1700° C. for 1 hour.

FROM TABLE 2

Again, when Al$_2$O$_3$ varies between 2 and 15% by weight there is observed improved density with increasing Al$_2$O$_3$; however, bloating became a problem, as in Table 1, above 15% by weight Al$_2$O$_3$ but was found to be controllable by control of sintering schedule as in Table 1.

It was noted that, as the SiO$_2$ content was reduced to the order of 25.0% by weight, densification of the material became more difficult, such that by the time the silica level was reduced to 22.0% by weight not only was it difficult to obtain a material whose density was greater than 85% of theoretical density, but the material even though other constituents were varied, became incapable of containing 80% of the O'-phase silicon aluminium oxynitride. It was concluded that, while 22% by weight silica is capable of producing useful materials, it is preferred to make this minimum 25% by weight.

Experiments conducted to determine the upper limit of Si$_3$N$_4$ in the starting mixture showed that as the Si$_3$N$_4$ rose above 65% by weight, the silica needed to balance with the Si$_3$N$_4$ and give a 1:1 molar relationship meant that the total Si$_3$N$_4$ and SiO$_2$ needed was of the order of 93% by weight. The remaining constituents of Y$_2$O$_3$, Al$_2$O$_3$ and extra SiO$_2$ were made to be of the order of 3% by weight, 2.5% by weight and 1.5% by weight respectively, i.e retaining a substantially 2:1 molar relationship for the SiO$_2$:Y$_2$O$_3$. Sintering the mixture in two stages i.e, 1600° C. for 1 hour followed by 1800° C. for 1 hour, gave a product of >80% O'-phase silicon aluminium oxynitride having a density of 2.44 g cc$^{-1}$ and whose estimated theoretical density is a 2.87 g. cc$^{-1}$. i.e >85% theoretical density. It was considered that about 3% by weight Y$_2$O$_3$ was about the minimum Y$_2$O$_3$ content to ensure that the products of the invention could be obtained while avoiding the use of pressure sintering. However, tests performed on products with Y$_2$O$_3$ content as low as 1% by weight were found to give satisfactory products according to the invention, providing such products were formed by pressure sintering. It was also found that densification with mixes containing such low amounts of Y$_2$O$_3$ was further assisted as the alumina content was increased.

A further set of samples was prepared in accordance with the invention in the same manner as those of the first set of examples and in which the Y$_2$O$_3$ content of the mix was further increased up to about 11% by weight of the mixture. The mixes are shown in Table 3 with the firing condition being shown at the foot of Table 3.

TABLE 3

| Sample | Si$_3$N$_4$ 1:1 molar | SiO$_2$ | Excess SiO$_2$ | Al$_2$O$_3$ | Y$_2$O$_3$ | % Th. Density |
|---|---|---|---|---|---|---|
| L* | 57.1 | 24.5 | 5.8 | 1.9 | 10.7 | 98 |
| M/ | 56.0 | 24.0 | 5.6 | 4.0 | 10.4 | >98 |
| N/ | 54.7 | 23.4 | 5.5 | 6.2 | 10.2 | >99 |
| P/ | 52.9 | 22.7 | 5.3 | 9.2 | 9.9 | >99 |
| Q// | 50.2 | 21.5 | 5.0 | 13.9 | 9.4 | >99 |

*fired at 1600° C. for 1 hour. followed by 1800° C. for 1 hour.
/fired at 1600° C. for 30 min. followed by 1700° C. for 1 hour.
//fired at 1600° C. for 1 hour.

FROM TABLE 3

These experiments together with those of Table 1 established that the preferred maximum amount of SiO$_2$ in the starting mixture was about 30% by weight while the Al$_2$O$_3$ is varied over its preferred range of 1 to 15% by weight. Again, as the alumina content rose above the preferred upper limit of 15% by weight to a maximum of 20% by weight, it was found that bloating could only be avoided if a controlled sintering schedule was followed as exemplified with the samples of Table 1. It was found that as the SiO$_2$ in the starting mixture was increased above about 30% by weight, it became progressively more difficult to balance the excess SiO$_2$ with the Y$_2$O$_3$, in the molar ratio of 2:1 respectively due to there being a surfeit of SiO$_2$. When the SiO$_2$ level exceeded a value of about 35% by weight of the total mixture, not only was there bloating of the final material observed but X-ray diffraction of the material showed the required limit of 80% O'-phase silicon aluminium oxynitride had been reached.

It was therefore concluded that 35% by weight SiO$_2$ would be the limit of SiO$_2$ in the starting mixture to ensure satisfactory materials produced, however it would be preferred to lower this limit to 30% by weight in a production run.

Experiments conducted using higher quantities of Y$_2$O$_3$ than the 10.7% by weight showed that satisfactory materials could be produced up to 15% by weight Y$_2$O$_3$ in the starting mixture, but by then it was becoming difficult to obtain greater than 80% O'-phase silicon aluminium oxynitride in the sintered material. It was estimated that 12% by weight Y$_2$O$_3$ represented a preferred upper limit for materials produced and which exhibited consistently good properties.

Further experiments conducted to recognise the significance of varying the relative proportions of SiO$_2$ to Si$_3$N$_4$ in the mixture showed that (subject to there being a minimum SiO$_2$:Si$_3$N$_4$ molar ratio of 1:1) the amount of excess silica required to ensure that, with Y$_2$O$_3$, a liquid phase is present during sintering, should be such that the total amount of silica to the total amount of Si$_3$N$_4$ in the mix does not exceed 1.5:1 molar ratio. Thus when the minimum amount of 50% by weight Si$_3$N$_4$ is being used in the mix, the maximum SiO$_2$ which will be capable of providing the desired material will be 32% by weight.

Further experiments were then conducted to investigate the effect of reducing the excess silica in the mixture to zero, i.e there was only sufficient SiO$_2$ to balance with the Si$_3$N$_4$ in the 1:1 molar relationship. It was found however that satisfactory materials could only be obtained if the Al$_2$O$_3$ content of the mixture was high, preferably greater than about 15% by weight of the starting mixture. Materials so produced were found not to exhibit as high an oxidation resistance as those in which some excess of SiO$_2$, above that to balance with the Si$_3$N$_4$ in a 1:1 molar ratio, was present in the mixture.

All the examples of the invention were then subjected to a post heat treatment in order to devitrify the glass phase present. This was achieved by placing the sintered samples in an atmosphere low in oxygen potential and heating the samples to 1300° C., holding for 25 hours and natural cooling to room temperature while maintaining the low oxygen potential atmosphere.

The crystalline phase which had precipitated from the glass was found to be an yttrium silicate. When the alumina content of the starting mixture was high, greater than 15% by weight, mullite was also detected in the final material.

While in the devitrification examples given, 1300° C. was the temperature used, devitrification will occur at temperatures as low as 1000° C. and up to about 1400° C. However, prolonged heating at the lower temperatures will be required if complete devitrification is required. Whilst in the examples quoted post-heat treatment was used to effect devitrification, a controlled cooling of the as-sintered samples would have been equally effective, such controlled cooling would normally have been at a rate slower than 100° C./hr.

In a further set of examples according to the invention, silica and yttrium oxide as used in the first set of examples were mixed in powder form in the molar ratio of 2:1 and fired at 1800° C. to form a yttrium silicate, $Y_2Si_2O_7$. The product was ground using alumina media to a particle size of about 2 to 5 micrometers.

A mixture comprising 61.1 g of silicon nitride, 23.7 g of silica and 2.2 g of alumina was divided into two batches and to one batch 8.5 g of the yttrium silicate was added while to the second batch 16.9 g of the yttrium silicate was added. Each batch was milled using alumina media for 25 hours with pick-up of 4.5 g of alumina. The final mixture of the first batch contained 59.3% by weight of silicon nitride, 25.5% by weight silica, 6.7% by weight alumina and 8.5% by weight yttrium silicate. It will be appreciated that the 59.3% by weight of silicon nitride and the 25.5% by weight of silica are in the molar ratio 1:1. The final mixture of the second batch contained 54.7% by weight silicon nitride, 23.5% by weight silica, 6.2% by weight alumina and 15.6% by weight of yttrium silicate, with the silicon nitride and silica again being in the molar ratio 1:1.

Cold compaction and isostatic pressing was conducted as in the first set of examples and the sintering in nitrogen was done at 1750° C. for 2 hours. X-ray diffraction analysis of the products showed the main crystalline phase to be O'-phase silicon aluminium oxynitride together with a trace of silicon nitride. While evaluation of these materials as engineering ceramics has not yet been made, it is envisaged that their usefulness will be enhanced by devitrification treatment.

While in the examples quoted, yttria and yttrium silicate have been exemplified as the metal compounds, the hydroxide, carbonate, oxynitride or nitrate could be used. While yttrium has been used above as the metal other than silicon and aluminium, the metal could be one or more of the group comprising yttrium, lithium, magnesium, calcium, scandium, cerium and the other rare earth elements. In some instances, it will be appreciated that the metal element so chosen may fill vacant sites within the silicon aluminium oxynitride having the lattice structure of silicon oxynitride.

Inert additives, such as tungsten carbide, silicon carbide and metals such as molybdenum, etc., may be included in the products of the invention if required to enhance the properties of the final product.

The products of the invention were rich in O'-phase silicon aluminium oxynitride and had a Y—Si—Al—O—N glass phase at the grain boundaries. However, devitrification allowed either partial or complete conversion of the glass to a crystalline phase. Oxidation tests on all products were excellent and were of an order less than 0.1 $g.m^{-2} h^{-1}$ in static air at 1300° C. between 12½ and 20 hours, there being little difference between samples before and after devitrification.

I claim:

1. A silicon aluminium oxynitride product containing from 80% to 98% by weight of O'-phase silicon aluminium oxynitride as a first phase and 20% to 2% by weight of at least one second phase which contains silicon and at least one metal other than silicon or aluminium, said percentages being based on the total weight of said first and second phases, said product being from about 85% to about 99% of theoretical density and having a microstructure which is a crystallised network of said O'-phase silicon aluminium oxynitride with said at least one second phase as a grain boundary phase.

2. A product as claimed in claim 1, wherein said first and second phases constitute a major proportion of said product.

3. A product as claimed in claim 1, consisting essentially of said first and second phases together with the optional inclusion of an inert dispersed phase.

4. A product as claimed in claim 1, wherein said at least one second phase consists of or includes a glass phase.

5. A product as claimed in claim 1, wherein said at least one second phase consists of or includes a crystalline phase.

6. A product as claimed in claim 1, wherein said metal other than silicon and aluminium is selected such that it reacts with silica and alumina to form a glass phase which is molten during the sintering of said product and from which said O'-phase silicon aluminium oxynitride precipitates.

7. A product as claimed in claim 6, wherein said metal other than silicon and aluminium is selected from the group consisting of yttrium, lithium, magnesium, calcium, scandium, cerium and the other rare earth elements.

8. A method of forming a dense ceramic product comprising the steps of forming a powder mixture containing (a) 50% to 65% by weight silicon nitride, (b) 22% to 35% by weight silica, in which the molar ratio of silica to silicon nitride is at least 1:1, (c) 1% to 20% by weight (on an oxide basis) of an oxygen-containing aluminium compound and (d) 1% to 15% by weight (on an oxide basis) of at least one compound selected from oxides, hydroxides, carbonates, oxynitrides, nitrates or silicates of metals other than silicon or aluminium, said percentages being based on the total weight of ingredients (a) to (d); sintering said powder mixture at a temperature of from 1600° C. to 1900° C. in a non-oxidising atmosphere whereby said aluminium compound, said at least one compound and part of said silica in said mixture react to form a liquid phase from which is precipitated O'-phase silicon aluminium oxynitride; and cooling the sintered material to form a product containing said O'-phase silicon aluminium oxynitride and at least one grain boundary phase containing silicon and said metal.

9. A method as claimed in claim 8, wherein the molar ratio of silica to silicon nitride in the powder mixture does not exceed 1.5:1.

10. A method as claimed in claim 8, wherein said powder mixture contains silicon nitride in an amount of from 50% to 60% by weight, said silica in an amount of from 25% to 30% by weight, said aluminium compound in an amount of from 1.0% to 15% by weight (on an oxide basis) and said at least one compound in an amount from 3% to 12% by weight (on an oxide basis).

11. A method as claimed in claim 8, wherein the sintering step is performed in the absence of applied pressure.

12. A method as claimed in claim 8, wherein said at least one compound is selected so as to react with part of the silica and the oxide of aluminium to give, during reaction, an alumino silicate of said metal which is molten at the sintering temperature.

13. A method as claimed in claim 12, wherein said molten alumino silicate of said metal(s) also contains combined nitrogen.

14. A method as claimed in claim 8, wherein the cooling step is effected naturally to room temperature to ensure that a second phase comprising a glass containing silicon, aluminium and said metal(s) exists in said product.

15. A method as claimed in claim 14, wherein after said cooling step, the product is heat treated by reheating it to a temperature of the order of 1000° C. to 1400° C. to cause the glass phase to be devitrified.

16. A method as claimed in claim 8, wherein the cooling step is effected at a sufficiently slow rate to cause the glass to be devitrified.

17. A method as claimed in claim 16, wherein the cooling rate is less than 100° C./hr.

18. A method as claimed in claim 8, wherein said metal of said at least one compound is yttrium, lithium, magnesium, calcium, scandium, cerium or another rare earth element, and said compound is the oxide or a compound which decomposes to the oxide at the sintering temperature.

19. A method as claimed in claim 8, wherein said at least one compound is reacted with part of the silica to produce a vitreous or crystalline compound prior to reaction with the remaining components to obtain the required products.

20. A method as claimed in claim 8, wherein said at least one compound is reacted with silica and alumina to produce a vitreous or crystalline compound prior to reaction with the remaining components to obtain the required products.

21. A method as claimed in claim 8, wherein said at least one compound is yttria and the silica and yttria are reacted together in a molar ratio of 2:1 to form yttrium silicate which is included in the mixture before the sintering step.

22. A method as claimed in claim 8, wherein the product contains from 80% to 98% by weight of said O'-phase silicon aluminium oxynitride as a first phase and 20% to 2% by weight of said at least one grain boundary phase, said percentages being based on the total weight of said phases, and wherein said product has a density of from about 85% to about 99% of the theoretical density.

23. A method as claimed in claim 22, wherein said phases constitute a major proportion of said product.

24. A method as claimed in claim 22, wherein said product consists essentially of said phases together with the optional inclusion of an inert dispersed phase.

* * * * *